(12) United States Patent
Cruickshank, III et al.

(10) Patent No.: US 9,184,929 B2
(45) Date of Patent: Nov. 10, 2015

(54) NETWORK PERFORMANCE MONITORING

(75) Inventors: Robert F. Cruickshank, III, Chichester, NY (US); Daniel J. Rice, Windham, NH (US); Jason K. Schnitzer, Boulder, CO (US); Dennis J. Picker, Lincoln, MA (US); Raphael Aaron Leeman, Natick, MA (US); Ramesh H. Vaswani, Nashua, NH (US); Robert James Gauvin, Hampton, NH (US)

(73) Assignee: ARRIS Enterprises, Inc., Suwanee, GA (US)

( * ) Notice: Subject to any disclaimer, the term of this patent is extended or adjusted under 35 U.S.C. 154(b) by 1921 days.

(21) Appl. No.: 09/995,056

(22) Filed: Nov. 26, 2001

(65) Prior Publication Data

US 2003/0126254 A1    Jul. 3, 2003

(51) Int. Cl.
*G06F 15/173* (2006.01)
*H04L 12/24* (2006.01)
*H04L 12/26* (2006.01)

(52) U.S. Cl.
CPC .............. *H04L 12/24* (2013.01); *H04L 41/00* (2013.01); *H04L 41/044* (2013.01); *H04L 41/22* (2013.01); *H04L 43/045* (2013.01); *H04L 43/067* (2013.01); *H04L 43/0811* (2013.01); *H04L 41/0631* (2013.01); *H04L 43/0817* (2013.01); *H04L 43/0829* (2013.01); *H04L 43/0852* (2013.01); *H04L 43/16* (2013.01)

(58) Field of Classification Search
CPC . H04L 43/0852; H04L 43/16; H04L 43/0811; H04L 43/0817; H04L 43/0829; H04L 43/045; H04L 43/067; H04L 41/0631; H04L 41/08; H04L 41/0803; H04L 41/085; H04L 41/0853; H04L 41/0896
USPC .................. 709/224, 226, 223, 201, 202, 203
See application file for complete search history.

(56) References Cited

U.S. PATENT DOCUMENTS

| | | | | |
|---|---|---|---|---|
| 5,999,179 A * | 12/1999 | Kekic et al. | ................... | 715/734 |
| 6,678,250 B1 * | 1/2004 | Grabelsky et al. | ............ | 370/241 |
| 6,704,288 B1 * | 3/2004 | Dziekan et al. | ............... | 370/248 |
| 6,742,187 B1 * | 5/2004 | Vogel | ............................ | 725/126 |
| 6,798,745 B1 * | 9/2004 | Feinberg | ........................ | 370/235 |
| 7,035,907 B1 * | 4/2006 | Decasper et al. | ............. | 709/212 |
| 7,072,964 B1 * | 7/2006 | Whittle et al. | ................ | 709/226 |
| 8,370,420 B1 * | 2/2013 | Decasper et al. | ............. | 709/202 |
| 2002/0184555 A1 * | 12/2002 | Wong et al. | ........................ | 714/4 |
| 2003/0018769 A1 * | 1/2003 | Foulger et al. | ................ | 709/223 |
| 2003/0086425 A1 * | 5/2003 | Bearden et al. | ................ | 370/392 |

* cited by examiner

*Primary Examiner* — Dhairya A Patel
(74) *Attorney, Agent, or Firm* — Troy A. Van Aacken

(57) ABSTRACT

A method for use in a broadband network includes displaying the cumulative amounts in a hierarchy of network issues, the hierarchy including a summary category including summary values indicating total cumulative amounts of time that the network elements in the at least a desired portion of the network were considered at corresponding qualities of performance, the hierarchy further including a plurality of sub-categories contributing to the summary category, and the sub-categories each further comprising at least one sub-sub-category contributing to the sub-categories.

16 Claims, 8 Drawing Sheets

NETWORK PERFORMANCE MONITORING

FIELD OF THE INVENTION

The invention relates to monitoring network performance and more particularly to monitoring broadband network performance using performance metrics.

BACKGROUND OF THE INVENTION

Communications networks are expanding and becoming faster in response to demand for access by an ever-increasing amount of people and for demand for quicker response times and more data-intensive applications. Examples of such communications networks are for providing computer communications. Many computer users initially used, and many to this day still use (there are an estimated 53 million dial-up subscribers currently), telephone lines to transmit and receive information. To do so, these people convey information through a modem to convert data from computer format to telephone-line format and vice versa. Presently, a multitude of computer users are turning to cable communications. It is estimated that there are 5.5 million users of cable for telecommunications at present, with that number expected to increase rapidly in the next several years.

In addition to cable, there are other currently-used or anticipated broadband communications network technologies, with others as yet to be created sure to follow. Examples of other presently-used or presently-known broadband technologies are: digital subscriber line (DSL) with approximately 3 million subscribers, satellite, fixed wireless, free-space optical, datacasting, and High-Altitude Long Operation (HALO).

Broadband networks currently serve millions of subscribers, with millions more to come. These networks use large numbers of network elements, such as Cable Modem Termination Systems (CMTSs) physically distributed over wide areas, and other network elements, such as Cable Modems (CMs) located, e.g., in subscribers' homes. With so many network elements, problems in the networks are a common occurrence. Monitoring networks to assess network performance, and locating and correcting, or even preferably anticipating and preventing, network problems are desirable functions that are potentially affected by the increasing number of subscribers, and corresponding size and complexity of networks.

SUMMARY OF THE INVENTION

In general, in an aspect, the invention provides a computer program product including computer-executable instructions for causing a computer to obtain performance data related to performance of a broadband network, and provide a hierarchical display of network performance, the hierarchical display including a first level with first data indicative of network operation and a second level with second data indicative of a plurality of issues comprising the first level of network performance, where the second level includes multiple issues that contain a third level with third data indicative of network issues comprising at least some of the secondary level issues.

Implementations of the invention may include one or more of the following features. The first data are indicative of overall performance of one of the network, and a selected portion of the network. The first data are indicative of overall performance of the network and the issues at the second level include at least one of connectivity and traffic. The computer program product further includes instructions for causing the computer to provide more detail of issues comprising a selected level. The more detail includes at least one of locations of network elements associated with the selected level, and metrics corresponding to the network elements and associated with at least one issue comprising the selected level. The computer program product further includes instructions for causing the computer to provide more detail regarding a selected portion of the more detail provided of issues comprising a selected level. The computer program product further includes instructions for causing the computer to sort the more detail according to at least one selected criterion. The computer program product further includes instructions for causing the computer to analyze the more detail and to do at least one of: provide at least one of an indication of a likely network problem, and a suggested action for addressing the likely network problem; and implement corrective action to attempt to address the likely network problem.

Further implementations of the invention may include one or more of the following features. The collected data are metrics of network performance derived from raw data indicative of network activity. The computer program product further includes instructions for causing the computer to derive the metrics from the raw data. The instructions for causing the computer to derive the metrics include instructions for causing the computer to obtain first metrics of performance of at least a portion of the broadband network, and combine a plurality of first metrics into a second metric of network performance indicative of a higher-level of network performance than indicated by the first metrics. The instructions for causing the computer to combine first metrics weight different metrics differently dependent upon perceived relevance of an issue associated with the metric to network performance. The instructions for causing the computer to derive the metrics include instructions for causing the computer to perform comparisons of first metrics derived from the raw data with thresholds and to provide second metrics based upon the comparisons. The second metrics provide indicia of grades of degraded performance of portions of the network as a function of time.

Further implementations of the invention may include one or more of the following features. The hierarchical display is independent of an amount of network elements contributing to the indicia of network performance. The second data are indicative of network issues perceived to affect network performance more than network issues absent from the display. The displayed data associated with levels provide indicia of absolute performance of portions of the network associated with the respective levels.

Further implementations of the invention may include one or more of the following features. The displayed data associated with a level provide indicia of relative performance of portions of the network associated with the respective levels. The displayed data associated with levels provide indicia of absolute performance of portions of the network associated with the respective levels. The computer program product further includes instructions for providing a display of the data associated with levels over time. The computer program product further includes instructions for providing a display of the data associated with levels over time.

Further implementations of the invention may include one or more of the following features. The first and second data provide indicia of grades of degradation of performance of at least portions of the network as a function of time. The network is a DOCSIS network including cable modems and cable modem termination systems, and the first and second data indicate numbers of cable-modem hours at the grades of degradation.

In general, in another aspect, the invention provides a computer program product including computer-executable instructions for causing a computer to obtain indicia of cumulative amounts of time that network elements of at least a desired portion of a broadband network were considered at corresponding qualities of network performance during a designated time frame, and display the cumulative amounts in a hierarchy of network issues, the hierarchy including a summary category including summary values indicating total cumulative amounts of time that the network elements in the at least a desired portion of the network were considered at corresponding qualities of performance, the hierarchy further comprising a plurality of sub-categories contributing to the summary category, and the sub-categories each further comprising at least one sub-sub-category contributing to the sub-categories.

Implementations of the invention may include one or more of the following features. The summary values indicate total cumulative amounts of time that all the network elements in the at least a desired portion of the network were considered at corresponding qualities of performance. The computer program product further includes instructions for causing the computer to indicate that categories contributing to a higher-level category are one of direct contributors and indirect contributors to the higher-level category. The computer program product further includes instructions for causing the computer to display additional information regarding a selected category of cumulative amounts. The computer program product further includes instructions for causing the computer to display further additional information regarding selected additional information. The computer program product further includes instructions for causing the computer to determine network areas that are most-negatively contributing to network performance. The computer program product further includes instructions for causing the computer to recommend action, regarding at least one of the network areas that are most-negatively contributing to network performance, for improving network performance. The computer program product further includes instructions for causing the computer to implement action, regarding at least one of the network areas that are most-negatively contributing to network performance, for improving network performance. The instructions for causing the computer to obtain indicia of cumulative amounts of time that network elements cause the computer to access a storage area containing the indicia.

Various aspects of the invention may provide one or more of the following advantages. A wide variety of information from very large, e.g., million-element, networks can be aggregated and presented in a single display instance. What network problems exist, when and where they exist or existed, and which are worse than others, and what issues are causing problems can be identified quickly and easily. Network performance can be provided in terms of both relative quality and absolute value. Information regarding network performance can be aggregated in time and topology, and what time period and/or what portions of a network to aggregate information for can be selected. High-level summarizations of network quality can be provided. Simple mechanisms are provided to quickly determine relative network performance in three dimensions: time, network topology, and network issue. Network-performance-related data can be collected synchronously and/or asynchronously. Operations staff can be informed and corrective measures recommended/applied to individual users/network elements responsible for network (e.g., cable plant) congestion, connectivity and/or abuse. Plant transport failures and choke points can be timely identified. Service slowdowns and outages can be reduced and customer retention and acquisition improved. Cable Operators can offer tiered, delay- and loss-sensitive services (e.g., voice quality services). Management platforms are provided that scales to millions of managed devices. Automatic ticket opening, closing and/or broadband network adaptive improvement (and possibly optimization) can be provided. Outages can be predicted and prevented. Network areas can be targeted for repair based on data space trending & triangulation opportunities. Network service can be kept "up" while targeting and scheduling areas for repair.

These and other advantages of the invention, along with the invention itself, will be more fully understood after a review of the following figures, detailed description, and claims.

DETAILED DESCRIPTION OF PREFERRED EMBODIMENTS

The invention provides techniques for monitoring and evaluating network, especially broadband network, performance. Both absolute and relative values for different areas and aspects of network performance are provided, stemming from raw network data. Raw data are collected from the network and manipulated into metrics (i.e., measurements of network performance based on raw data), that can be manipulated into further metrics. These metrics are compared against thresholds indicative of acceptable, degraded performance, and severely degraded performance. Data collections and metric-to-threshold comparisons are performed over time, e.g., periodically. Using the comparisons, and the times over which the comparisons are made, time-dependent performance values are determined, namely values for degraded and severely-degraded hours. In a broadband network, values for Degraded Modem Hours and Severely-Degraded Modem Hours (DMH and SDMH, respectively) are determined.

Time-dependent network performance values are combined based upon network impact and network topology. Network impact includes whether the metric is an indication of, e.g., network capacity/traffic versus network connectivity, signal quality (e.g., signal-to-noise ratio), power, or resets. Values related to network impact are determined for the lowest levels of the network, and based upon the topology of the network, the values for lower levels are combined to yield cumulative values for higher and higher levels, until a summary level is achieved, yielding a DMH and an SDMH for the network as a whole. Cumulative values are thus derived, and/or are derivable, and available for various levels of the network.

Network performance values may be provided by a user interface such that relative and absolute values of network performance may be quickly discerned for various, selectable, network levels and for selectable network attributes. Network DMH and SDMH are provided in summary format for the entire network, regardless of size, in a concise format, e.g., a single computer display screen. Preferably, network DMH and SDMH are provided in a table arranged according to network traffic and network connectivity. Factors contributing to traffic and connectivity DMH and SDMH are also provided, and designated as to whether the factors are direct or indirect contributors to the network performance. The network performance values displayed depend on the level or levels of network topology selected by a user. The network performance values displayed depend on the length of historical time selected by a user. Also, a displayed category can be selected, and in response, data contributing to the selected category will be revealed. This revealed data may be further selected and further detail provided. This technique may be used to locate problem areas within the network. Graphs of performance values with respect to time may also be provided.

Figure 1:
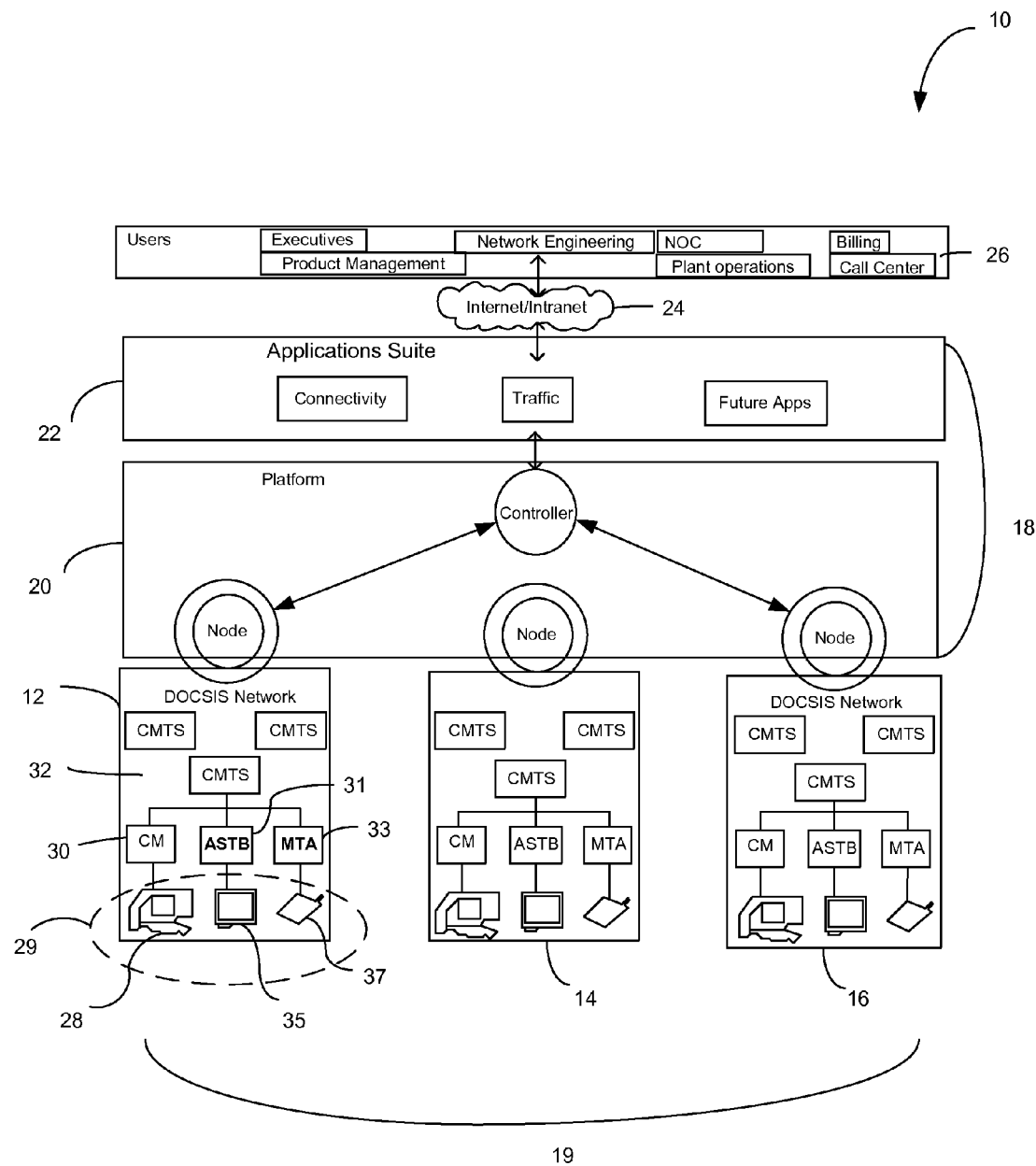
FIG. 1 is a simplified diagram of a telecommunications network including a network monitoring system.

Referring to FIG. 1, telecommunication system 10 includes DOCSIS™ (data over cable service interface specification) networks 12, 14, 16, a network monitoring system 18 that includes a platform 20 and an applications suite 22, a packetized data communication network 24 such as an intranet or the global packet-switched network known as the Internet, and network monitors/users 26. The networks 12, 14, 16 are configured similarly, with the network 12 including CMTSs 32 and consumer premise equipment (CPE) 29 including a cable modem (CM) 30, an advanced set-top box (ASTB) 31, and a multi-media terminal adaptor (MTA) 33. Users of the DOCSIS networks 12, 14, 16, communicate, e.g., through the computer 28 and the cable modem (CM) 30 (or through a monitor 35 and the ASTB 31, or through a multimedia terminal 37 and the MTA 33) to one of the multiple CMTSs 32.

Data relating to operation of the networks 12, 14, 16 are collected by nodes 34, 36, 38 that can communicate bi-directionally with the networks 12, 14, 16. The nodes 34, 36, 38 collect data regarding the CMTSs 32, and the CPE 29 and manipulate the collected data to determine metrics of network performance. These metrics can be forwarded, with or without being combined in various ways, to a controller 40 within the platform 20.

The controller 40 provides a centralized access/interface to network elements and data, applications, and system administration tasks such as network configuration, user access, and software upgrades. The controller can communicate bi-directionally with the nodes 34,36, 38, and with the applications suite 22. The controller 40 can provide information relating to performance of the networks 12, 14, 16 to the application suite 22.

The application suite 22 is configured to manipulate data relating to network performance and provide data regarding the network performance in a user-friendly format through the network 24 to the network monitors 26. The monitors 26 can be, e.g., executives, product managers, network engineers, plant operations personnel, billing personnel, call center personnel, or Network Operations Center (NOC) personnel.

The system 18, including the platform 20 and the application suite 22, is preferably comprised of software instructions in a computer-readable and computer-executable format that are designed to control a computer. The software can be written in any of a variety of programming languages such as C++. Due to the nature of software, however, the system 18 may comprise software (in one or more software languages), hardware, firmware, hard wiring or combinations of any of these to provide functionality as described above and below. Software instructions comprising the system 18 may be provided on a variety of storage media including, but not limited to, compact discs, floppy discs, read-only memory, random-access memory, zip drives, hard drives, and any other storage media for storing computer software instructions.

Figure 2:
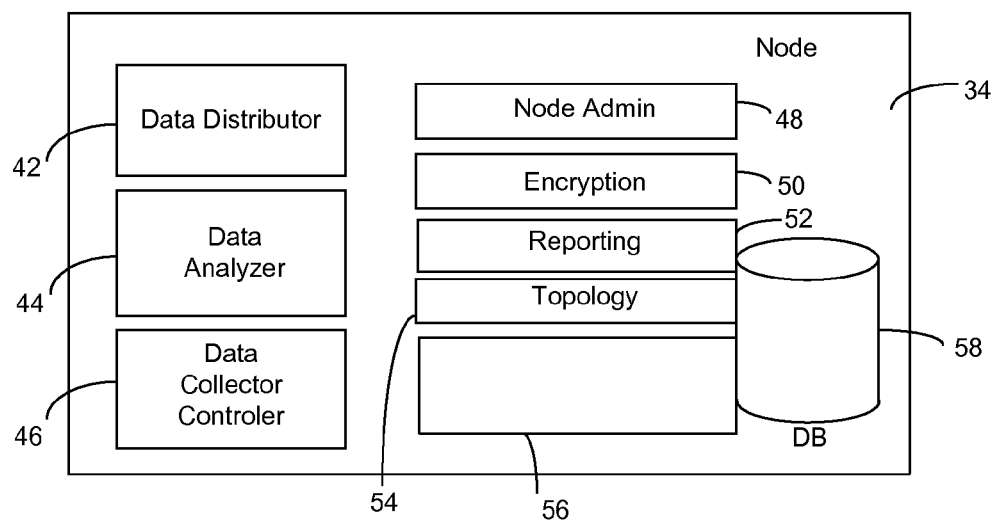
FIG. 2 is a block diagram of a software architecture of a portion of the network monitoring system shown in FIG. 1.

Referring also to FIG. 2, the node 34 (with other nodes 36, 38 configured similarly) includes a data distributor 42, a data analyzer 44, a data collector controller 46, a node administrator 48, an encryption module 50, a reporting module 52, a topology module 54, an authorization and authentication module 56, and a database 58. The elements 44, 46, 48, 50, 52, 54, and 56 are software modules designed to be used in conjunction with the database 58 to process information through the node 34. The node administration module 48 provides for remote administration of node component services such as starting, stopping, configuring, status monitoring, and upgrading node component services. The encryption module 50 provides encrypting and decrypting services for data passing through the node 34. The reporting module 52 is configured to provide answers to data queries regarding data stored in the database 58, or other storage areas such as databases located throughout the system 18. The topology module 54 provides for management of network topology including location of nodes, network elements, and high-frequency coax (HFC) node combining plans. Management includes tracking topology to provide data regarding the network 12 for use in operating the network 12 (e.g., how many of what type of network elements exist and their relationships to each other). The authorization and authentication module 56 enforces access control lists regarding who has access to a network, and confirms that persons attempting to access the system 18 are who they claim to be. The data distributor 42, e.g., a publish-subscribe bus implemented in JMS, propagates information from the data analyzer 44 and data collector controller 46, that collect and analyze data regarding network performance from the CMTSs 32 and CPE 29.

The data collector controller 46 is configured to collect network data from, preferably all elements of, the network 12, and in particular the network elements such as the CMTs 32 and any cable modems such as the cable modem 30. The controller 46 is configured to connect to network elements in the network 12 and to control the configuration to help optimize the network 12. Thus, the system 18 can automatically adjust error correction and other parameters that affect performance to improve performance based on network conditions. The data collector controller 46 can obtain data from the network 12 synchronously, by polling devices on the network 12, or asynchronously. The configuration of the controller 46 defines which devices in the network 12 are polled, what data are collected, and what mechanisms of data collection are used. The collector 46 is configured to use SNMP MIB (Simple Network Management Protocol Management Information Base) objects for both cable modems, other CPE, and CMTSs, CM traps and CMTS traps (that provide asynchronous information) and syslog files. The collector 46 synchronously obtains data periodically according to predetermined desired time intervals in accordance with what features of the network activity are reflected by the corresponding data. Whether asynchronous or synchronous, the data obtained by the collector 46 is real-time or near real-time raw data concerning various performance characteristics of the network 12. For example, the raw data may be indicative of signal to noise ratio (SNR) power, CMTS resets, etc. The controller 46 is configured to pass the collected raw data to the data analyzer 44 for further processing.

The data analyzer 44 is configured to accept raw data collected by the controller 46 and to manipulate the raw data into metrics indicative of network performance. Raw data from which the SDMH and DMH values are determined may be discarded. The metrics determined by the data analyzer 44 provide both a relative evaluation of network performance for various issues as well as absolute values of network performance. The metrics also provide indicia of network performance as a function of time and are standardized/normalized to compensate for different techniques for determining/providing raw network data from various network element configurations, e.g., from different network element manufacturers. More detail regarding standardizing/normalizing of metrics is provided by co-filed application entitled "DATA NORMALIZATION," U.S. Ser. No. (to be determined), and incorporated here by reference.

The data analyzer 44 is configured to evaluate the metrics derived from the raw data against thresholds indicative of various levels of network performance over time. The thresholds used are selected to indicate grades or degrees or levels of network degradation indicative of degraded performance and severely degraded performance. If the derived metric exceeds the threshold for degraded performance, then the network element, such as a cable modem termination station interface corresponding to a cable modem, is considered to be degraded. Likewise, if the metric exceeds a severely degraded threshold, then the corresponding network element is considered to be severely degraded. Alternatively, thresholds and metrics could be configured such that metrics need to be lower than corresponding thresholds to indicate that associated network elements are severely degraded or degraded. Further, more than two gradations or degrees of network degradation may be used. Still further, various criteria could be used in lieu of thresholds to determine degrees of degradation of network performance. Indeed, the multiple thresholds imply ranges of values for the metrics corresponding to the levels of degradation of network performance.

The degree of network degradation, or lack of degradation (i.e., non-degraded network performance) is calculated by the data analyzer 44 as a function of time. Preferably, degrees of network degradation are reflected in values of degraded modem hours or severely degraded modem hours, or non-degraded modem hours. These various values are calculated by multiplying the number of unique modems at a particular status/degree of degradation by a sample time difference in hours between calculations of the degree of degradation (e.g., degraded modem hours equals number of unique modems times sample time Δ in hours). The number of severely degraded modem hours (SDMH), degraded modem hours (DMH) or non-degraded modem hours (NDMH) is calculated and saved along with a time stamp. This provides a record for degree of degradation of network performance associated with issue and time and network topology.

The analyzer 44 determines the thresholds for the various issues using a combination of parameterization of non-real-time complex computer models, non-real-time empirically controlled experiments, real-time information about network equipment configuration, real-time performance data and historical trends such as moving averages, interpolation, extrapolation, distribution calculations and other statistical methods based on data being collected by the node 34. Parameterizing provides simplified results of complex calculations, e.g., noise distribution integration, or packet size analysis of a distribution of packet sizes. Thresholds can be determined in a variety of other manners. The thresholds provide breaking points for what is determined to be, for that issue, an indication that a modem is degraded or severely degraded. The thresholds are parameterized such that comparison to the thresholds is a computationally efficient procedure.

The network issue thresholds vary depending upon whether the issues are contributing to network traffic or network connectivity. For example, network traffic is affected by CMTS processor performance, upstream traffic and downstream traffic, which are indirectly affected by outbound network-side interface (NSI) traffic and inbound network-side interface traffic, respectively. Connectivity is affected by upstream and downstream errors, CMTS resets and CM resets. Upstream errors are affected by upstream SNR, upstream receive power (UpRxPwr), and upstream transmit power (UpTxPwr). Downstream errors are affected by downstream SNR and downstream receive DnRxPwr. Other indirect and direct issues obtained from the network 19 can also be used.

The calculations performed by the data analyzer 44 yield values for DMH and SDMH for each CMTS interface associated with the node 34. Each node such as the node 34 has a unique set of CMTSs 32 associated with the node. The manipulations by the analyzer 44 yield the metric for SDMH and DMH for the CMTS interfaces of this unique set of CMTSs 32 associated with the node 34. The metrics determined by the analyzer 44 are conveyed through the data distributor 42 to the controller 40. The data analyzer 44 further aggregates the metric in time. Raw data may be sampled frequently, e.g., every one minute or every 15 minutes, but not reported by the data analyzer 44 to the controller 40 except every hour. Thus, the data analyzer 44 aggregates the metric determined throughout an hour, and provides an aggregated metric to the controller 40. The aggregated metric is indicative of the SDMH or DMH, based upon the metric that was determined more frequently than by the hour.

Examples of Status Rules for Calculating SDMH and DMH Connectivity

The following status rules describe the calculation of the performance metrics for a set of network issues related to connectivity. Status rules are also applied for traffic issues and examples of these are described below, after connectivity. The following are examples of computationally efficient techniques to determine whether the performance of a particular network issue is severely degraded, degraded, or non-degraded. Many of these rules are based on parameterization of complex computer models containing calculations that would be difficult to perform in real time. Status value judgments are based on the predetermined thresholds. These rules provide information related to overall health of an HFC plant and why the system 18 has determined that various CMTS interfaces have degraded connectivity status.

SDMH and DMH values are aggregated in time per the aggregation rules given with each contributor below. Using this aggregation, once the higher resolution of recent history has expired, the higher resolution for that data no longer exists in the system 18. This resolution bounds information available for reporting.

Table 1 lists direct and indirect contributors applicable to network connectivity. The thresholds for calculation of severely degraded modems and degraded modems are given for each contributor. For each sample time the number of severely degraded, degraded, or non-degraded modems are determined by the node 34 and stored by the node 34 along with the sample interval. As the samples are aggregated by the node 34 up to each resolution bin, the node 34 sums the total degraded hours and aggregates the degraded modem samples by the functions listed in the table. The node 34 performs the detailed logic shown for each sample interval for each CMTS interface. The node 34 applies the following algorithm in classifying modems as degraded, severely degraded, or non-degraded:

IF Threshold A=TRUE
  Then modems applied to Severely Degraded bin
ElseIF B=TRUE
  Then modems applied to Degraded bin
  Else modems applied to non-degraded bin.

The sample intervals apply to the intervals for which the data are collected. Some of the data for the calculation may be collected at slower rates than other data. Non-degraded hours and modems are retained to provide context for percentage-of-network calculations.

Several of the thresholds are based on theoretical calculations with adjustments for empirical performance. These thresholds have been parameterized for easy lookup to reduce and/or avoid real-time complex calculations.

TABLE 1

Degraded modem status thresholds.

| Contributor | Type | Severely Degraded Threshold | Degraded Threshold | Sample int. (minutes) | Aggregator (poll interval to 1 hour) |
|---|---|---|---|---|---|
| CM resets | Direct | >=15 CM resets per 15 minutes per cable interface | >=10 CM resets < 15 per 15 minutes per cable interface | Trap | The number of traps is summed per CM |
| CMTS resets | Direct | >=1 | NA | 1 | Note 1 |
| Downstream Codeword Error Ratio (CER) | Direct | CER >= 5% | 5% > CER >= 1% | 60 | Polled and calculated once per hour, 1 SDMH/DMH is added per CM exceeding threshold |
| Downstream RX Power | Indirect | Note 2 | Note 2 | 60 | Polled and calculated once per hour |
| Downstream SNR | Indirect | Note 3 | Note 3 | 60 | Polled and calculated once per hour |
| Upstream Codeword Error Ratio | Direct | CER >= 5% | CER > 1% | 15 | MAX over hour |
| Upstream Rx Power | Indirect | Note 4 | Note 4 | 15 | AVG over hour |
| Upstream SNR | Indirect | Note 5 | Note 5 | 15 | MIN over hour |
| Upstream Tx Power | Indirect | Note 6 | Note 6 | 60 | AVG over hour |

The aggregation listed is for derived data, not SDMH and DMH, and operations indicated in Table 1 may be performed more often, or less often, than every hour.

Some of the contributors may have calculations to identify fluctuations over time. Additionally, indicia such as T timers indicating signaling or noise problems impacting connectivity may be used, as well as statistics relating to physical layer problems such as ranging attempts and adjustment timing offsets, etc.

Note 1:

If there is any reset of a CMTS within an hour, then SDMH=# of unique modems associated with the CMTS times one hour.

Note 2:

The number of modems added to the CMTS interfaces as SDM (severely-degraded modems) or DM (degraded modems) is the number that exceed the threshold. In addition to Min and Max, spectral or trend qualities may be used in conjunction with a higher sample rate.

| | 64 QAM | | 256 QAM | |
|---|---|---|---|---|
| | SDM | DM | SDM | DM |
| | −16 dBmV >= RxPwr OR RxPwr > 20 dBmV | −12 dBmV >= RxPwr > −16 dBmV OR 20 dBmV >= RxPwr > 15 dBmV | | |
| SNR <= 33.6 dB | | | −7 dBmV >= RxPwr OR | −4 dBmV >= RxPwr > −7 |

-continued

|  | 64 QAM | | 256 QAM | |
| --- | --- | --- | --- | --- |
|  | SDM | DM | SDM | DM |
| SNR > 33.6 dB |  | RxPwr >= 20 dB | −15 dBmV > RxPwr OR RxPwr >= 20 dB | dBmV Or RxPwr > 15 dBmV −11 dBmV > RxPwr => −15 dBmV Or RxPwr > 15 dBmV |

Where QAM stands for Quadrature Amplitude Modulation, and dBmV stands for decibel-millivolts.

Note 3:

The number of modems added to the interfaces as SDM or DM is the number that exceeds the threshold. Some spectral qualities may be used in conjunction with a higher sample rate.

|  | 64 QAM | | 256 QAM | |
| --- | --- | --- | --- | --- |
|  | SDM | DM | SDM | DM |
| RxPwr > −6 dBmV |  | SNR <= 24.5 | 27.7 dB > SNR >= 24.5 | SNR <= 30.5 | 31 < SNR < 33.6 |
| RxPwr <= −6 dBmV |  |  | SNR < 34 | SNR < 37 dB |

Note 4:

| Symbol rate (ksym/s) | 160 | 320 | 640 | 1280 | 2560 |
| --- | --- | --- | --- | --- | --- |
| Rx Power SDM (dBmV) | −10 dBmV => RxPwr OR RxPwr >= 14 dBmV | −10 dBmV => RxPwr OR RxPwr >= 17 dBmV | −10 dBmV => RxPwr OR RxPwr >= 20 dBmV | −7 dBmV => RxPwr OR RxPwr >= 23 dBmV | −4 dBmV => RxPwr OR RxPwr >= 25 dBmV |
| Rx Power DM (dBmV) | −7 dBmV > RxPwr > −10 dBmV OR 14 dBmV > RxPwr > 11 dBmV | −7 dBmV > RxPwr > −10 dBmV OR 17 dBmV > RxPwr > 14 dBmV | −7 dBmV > RxPwr > −10 dBmV OR 20 dBmV > RxPwr > 17 dBmV | −4 dBmV > RxPwr > −7 dBmV OR 23 dBmV > RxPwr > 20 dBmV | −1 dBmV > RxPwr > −4 dBmV OR 25 dBmV > RxPwr > 22 dBmV |

Note 5:

| Protected RS (Reed Solomon) symbols for Max (modulation for long or short data grant) | Max (modulation for long or short data grant) | | | |
| --- | --- | --- | --- | --- |
|  | QPSK | | 16-QAM | |
| T = | SDM | DM | SDM | DM |
| 0 | 14.5 | 16 | 22 | 23.5 |
| 1 | 13 | 14 | 21 | 22 |
| 2 | 12.5 | 13.5 | 20 | 21 |
| 3 | 12 | 13 | 19.5 | 20.5 |
| 4 | 11.5 | 12.5 | 19 | 20 |
| 5 | 11.5 | 12 | 19 | 20 |
| 6 | 11 | 12 | 19 | 19.5 |
| 7 | 11 | 11.5 | 18.5 | 19.5 |
| 8 | 11 | 11.5 | 18.5 | 19 |
| 9 | 10.5 | 11.5 | 18 | 19 |
| 10 | 10.5 | 11 | 18 | 19 |

Where QPSK stands for Quadrature Phase-Shift Keying.
  Note 6:
  Some spectral or trend qualities may be used in conjunction with a higher sample rate. These values could also be parameterized with SNR and/or symbol rate.

| QPSK | | 16 QAM | |
|---|---|---|---|
| SDM | DM | SDM | DM |
| TxPwr > 55 dBmV | 53 dBmV < TxPwr < 55 dBmV | TxPwr > 58 dBmV | 56 dBmV < TxPwr < 58 dBmV |

Traffic

Table 2 lists direct and indirect contributors applicable to network connectivity.

TABLE 2

Degraded modem status thresholds.

| Contributor | Type | Severely Degraded Threshold | Degraded Threshold | Sample int. (minutes) | Aggregator (poll interval to 1 hour) |
|---|---|---|---|---|---|
| HFC Upstream Traffic Capacity | Direct | Utilization > 71% AND active modems > 55%*traffic/16e3 | Utilization > 59% AND active modems > 42%*traffic/16e3 | 15 | MAX for data, SUM for time |
| HFC Downstream Traffic Capacity | Direct | Utilization > 82% AND active modems > 82%*traffic/44e3 | Utilization > 72% AND active modems > 72%*traffic/44e3 | 15 | MAX for data, SUM for time |
| Processor Utilization | Indirect | Utilization > 88% | Utilization > 75% | 15 | MAX for data, SUM for time |
| Upstream NSI | Indirect | Utilization > 85% | Utilization > 70% | 1 | MAX for data, SUM for time |
| Downstream NSI | Indirect | Utilization > 85% | Utilization > 70% | 1 | MAX for data, SUM for time |

The aggregation listed is for derived data, not SDMH and DMH, and operations indicated in Table 1 may be performed more often, or less often, than every hour.

Metric Combining

Referring again to FIG. 1, the controller 40 is configured to receive metrics from the nodes 34, 36, 38 and to combine the received metrics by network issue and network topology. The controller 40 aggregates the metrics from the nodes 34, 36, 38 in accordance with the issues to which each metric relates and in accordance with the topology of the networks 12, 14, 16. Data are aggregated by the controller 40 from logically-lower levels relating to the networks 12, 14, 16 to logically-higher levels, leading to the high-level categories of traffic, connectivity and ultimately summary, incorporating connectivity and traffic. The summary, traffic, and connectivity categories apply to all portions of the networks 12, 14, 16, that together form a network 19, or any portions of the network 19 that are selected by a user 26 of the applications suite 22. The aggregation by the controller 40 provides the higher-level categories of summary, traffic, and connectivity and contributing issues. The contributing issues (contributors) are grouped into direct contributors and indirect contributors. Direct contributors are considered to be metrics with very high correlation to effect upon one or more of the users of the CPE 29. An indirect contributor is a metric with correlation to one or more of the CPE users and high correlation with a direct contributor. Calculations performed by the controller 40 can be implemented e.g., using C programming language, Java programming language and/or data base procedures.

Numerous techniques can be used to combine the metrics from the nodes 34, 36, 38 to yield aggregated data regarding network performance. How the metrics from the nodes 34, 36, 38 are combined by the controller 40 depend upon network issues of interest, network topology (including whether a portion of the network 19 has been selected for analysis), and is done in a manner to reflect effects of the issues upon performance of the network 19. The combined metrics provide categorized information allowing quick analysis of network performance in a convenient, compact format such as a single-screen display of a computer, independent of the number of elements within the network 19.

Examples of Possible Combining Options and Rules

The following are examples of different ways in which contributors can be combined. Any of these methods, as well as others, can be used and are within the scope of the invention. Preferably, a weighted average is used where the coefficients are changeable, e.g., in accordance with actual network data. Preferably also, an accurate absolute value of network performance is achieved, while avoiding or reducing double counting of upstream and downstream errors associated with a single cable modem. Preferably also a computationally efficient method is used to combine the network issues. The following background notes describe ideas related to combining logic.

Background Notes

Different weightings can be applied to different contributors, e.g., to reflect that some problems are qualitatively worse than others based on their impacts on users of the network 19. The system 18 provides both relative values and absolute values while also providing a flexible framework to add to or take from or to weight different problems differently as appropriate. The SDMH and DMH metrics indicate relative quality of both the network elements and network problems in a summary fashion of a small set of values for a huge number of devices, while at the same time providing an absolute value of quality.

Examples of issues that are qualitatively worse than others are CM resets and CMTS resets where it may be desirable to double add modems during the same hour. The system 18 preferably does not (but may) account for this doubling adding, although that is possible. This double counting may be justified in that resets are bad things to have happen to a network, and it is likely that if within an hour period CMTSs reboot and a set of CMs also reboot in an unrelated instance, then they are different bad events. Also, double counting may help simplify metric calculations, including combining calculations.

If a downstream CMTS interface is degraded for traffic, all associated modems are considered degraded. If not all upstream interfaces in the MAC (Media Access Control) domain are degraded for traffic, however, then an embodiment that divides the number of degraded interfaces by 2 is not absolutely accurate, but may be an acceptable trade-off for calculation efficiency. Similarly, if some upstream interfaces in a MAC domain are degraded, but downstream is not, then dividing by 2 also inaccurately reduces the number of degraded modems, but may be an acceptable trade-off for calculation efficiency. Also, if a downstream on one CMTS is degraded, and an upstream on another CMTS is degraded, these degradations should be added together and not divided by 2, but if the upstream is associated with the downstream on the same MAC interface, then modem errors in both the upstream and downstream direction would be double counted by simply adding. A possible rule is that normalizing may be performed within a MAC domain to not double count within a MAC domain, while not reducing visibility of the amount of degraded modems across multiple CMTS or MAC interfaces when the selection for topology includes multiple CMTS MAC interfaces.

Issues similar to upstream/downstream traffic surround upstream/downstream codeword errors. Thus, the codeword errors can add in similar fashion as the upstream/downstream traffic errors.

Also, the metrics of SDM and DM may be calculated more precisely (and possibly exactly) to have a more accurate absolute value by avoiding double counting by tracking each network issue on a per CM basis and weighting each network issue equally.

Combining Rule Option 1

In this option, upstream degradation is assumed to be associated with the same modem as for downstream degradation. Using this option, information of SDMH and DMH is available from analysis plug-ins on a per-CMTS-interface basis, and the MAC layer relationship between upstream and downstream CMTS interfaces is known. Also the SDMH and DMH metrics are presented on a per-CMTS-interface basis for determining SDMH and DMH for the complete network topology selected by the user 26.

Rule 1:

Only direct contributors are summed by the controller 40. SDMH and DMH are not summed and NDMH (Non-degraded modem hours) are determined and stored for use in calculating percentages of degradation levels as a function of the overall network. The choice of percentage versus absolute degraded modem hour numbers may be selected for display in any display (see below) or combining option.

Rule 2:

The numbers are combined in the controller 40 each hour, although combining more frequently or less frequently is acceptable. If a time frame is selected by the user 26, the number of SDMH and DMH are summed for each time stamp, e.g., one hour time stamp, within the time selected. Combined numbers are updated at the hour, or more frequently while being aggregated to the hour. Thus the combining rules assume calculations are being made from a single time stamp and at every time stamp.

Rule 3:

The topology selection is used to filter the specific CMTS interfaces with which the controller 40 works. The topology should not, however, be chosen to be a network element below a CMTS interface, such as a CM or CPE (Customer Premises Equipment such as a computer connected to a CM). The topology can also be selected to be the entire network 19 including millions of elements. If the topology selection is chosen to be a CMTS cable interface for a single direction, then values describing network performance will be 0 for contributors associated with the other data direction. For example, if the topology selected is only an upstream CMTS interface and network connectivity is analyzed, sub-issues contributing to higher-level issues that are associated with downstream interfaces and including downstream errors will be 0 as will be the downstream traffic value. Each network issue metric is calculated for each CMTS interface individually and summed across topology, adding the numbers of SDMH or DMH for each CMTS interface as described below. The weightings of the equations provided below can be chosen to emphasize some network issues at a higher priority than other network issues.

Rule 4: Up Traffic and Down Traffic:

For the table that lists single interfaces, the SDMH and DMH are shown as detail contributions to the total value for the complete topology selection.

If the selected topology is greater than a single interface, then sum all CMTS interfaces' DMH and SDMH values regardless of whether they are upstream or downstream or belong to the same MAC domain, and use that as the number for the degraded traffic contributor at the time stamp.

$u1=d1=0.5$
{
DMH_cable_interface=$u1*DMHutilup+d1*DMHutildn$
SDMH_cable_interface=$u1*SDMHutilup+d1*SDMHutildn$
}

Where utilup and utildn stand for upstream and downstream utilization, respectively.

Rule 5: Degraded Connectivity

For the table that lists single interfaces, the SDMH and DMH are shown as detail contributions to the total value for the complete topology selection.

If the selected topology is greater than a single interface, then sum all CMTS interfaces' DMH and SDMH values regardless of whether they are upstream or downstream or belong to the same MAC domain, and use that as the number for the degraded connectivity contributor at the time stamp. The weightings of the equations provided below can be chosen to emphasize some network issues at a higher priority than other network issues.

{
$u1=d1=0.5$
$v1=x1=1$
DMH_cable_interface_CER=$u1*DMHCERup+d1*DMHCERdown$

SDMH_cable_interface_CER=u1*SDMHCERup+
  d1*SDMHCERdown
}
Where CERup and CERdown stand for upstream and downstream codeword error ratio, respectively, although the actual calculation may be based on a large set of indicators.

Additionally, sum values together for each cable interface contained in the topology selection including all upstreams and downstreams.
{
  u1=d1=0.5
  DMH_cable_interface_CMTS_reset=v1*DMHcmtsre
    setsup+x1*DMHcmtsresetsdown
  SDMH_cable_interface_CMTS_reset=v1*SDMHcmtsre
    setsup+x1*SDMHcmtsresetsdown
  DMH_cable_interface_CM_reset=v1*DMHcmresetsup+
    x1*DMHcmresetsdown
  SDMH_cable_interface_CM_reset=v1*SDMHcmreset
    sup+x1*SDMHcmresetsdown
Finally
  z1=z2=z3=0.5
  DMH_cable_interface=z1*DMH_cable_interface_CER+
    z2*DMH_cable_interface_CMTS_reset+
    z3*DMH_cable_interface_CM_reset
  SDMH_cable_interface=z1*SDMH_cable_interface_
    CER+z2*SDMH_cable_interface_CMTS_reset+
    z3*DMH_cable_interface_CM_reset
This could be thought of as having two additional sub-issues affecting connectivity, one that sums the resets and one that sums the errors.
}

Rule 6: Degraded and Severely Degraded Subscriber Modems

Perform the following calculation: (the SDMH and DMH number for the time stamp for degraded traffic)+(the SDMH and DMH number for the time stamp for degraded connectivity) and divide by 2 for each interface and sum across all interfaces in topology selection.

This is the number to be used for the degraded and severely degraded subscriber modems contributor for the time stamp.

Combining Rule Option 2

Using this option, the number of modems are only divided by 2 if degraded up and downstream interfaces are in the same MAC domain. In this option, upstream degradation is assumed to be associated with the same modem as for downstream degradation. Using this option, information of SDMH and DMH is available from analysis plug-ins on a per-CMTS-interface basis, and the MAC layer relationship between upstream and downstream CMTS interfaces is known. Also the SDMH and DMH metrics are presented on a per-CMTS-interface basis for determining SDMH and DMH for the complete network topology selected by the user 26.

Rules 1-3:

Similar to Rules 1-3 from Option 1. Each network issue metric is calculated for each CMTS MAC interface individually, applied to the individual cable interfaces based on which modems in the MAC domain are associated with which cable interfaces (see portion 88 in FIG. 3 and description below), and summed across topology adding the numbers of SDMH or DMH for each CMTS interface (see portion 86 of FIG. 3 and description below).

Rule 4: Up Traffic and Down Traffic

For each MAC domain, that is a set of upstream and downstream interfaces:
{
  NU=SUM(Total_upstream interfaces in MAC domain)
  u1=u2=u3= . . . uNU=(0.5)
  d1=0.5
  DMH_MAC_DOMAIN=u1*DMHutilup1+
    u2*DMHutilup2+ . . . +uNU*DMHutilupNU+
    d1*DMHutildown 1
  SDMH_MAC_DOMAIN=u1*SDMHutilup1+
    u2*SDMHutilup2+ . . . +uNU*SDMHutilupNU+
    d1*SDMHutil down1
}

Sum SDMH and DMH total for each MAC domain in the topology selection and use that as the number for the Degraded Traffic contributor at the time stamp. If a single cable interface is chosen as the topology, then one of the terms for upstream or downstream is 0 and not the actual number associated with the opposite direction in the MAC domain.

Rule 5: Degraded Connectivity

For each MAC domain, that is a set of upstream and downstream interfaces:
{
  NU=SUM(Total_upstream interfaces in MAC domain)
  u1=u2=u3= . . . uNU=(0.5)
  d1=0.5
  DMH_MAC_DOMAIN_CER=u1*DMHCERup1+
    u2*DMHCERup2+ . . . +uNU*DMHCERupNU+
    d1*DMHCER down1
  SDMH_MAC_DOMAIN_CER=u1*SDMHCERup1+
    u2*SDMHCERup2+ . . . +uNU*SDMHCERupNU+
    d1*SDM HCERdown1
additionally
  u1=u2=u3= . . . uNU=(0.5)
  v1=v2=v3= . . . vNU=(0.5)
  d1=e1=0.5
  DMH_MAC_DOMAIN_CMTS_reset=u1*DMHcmtsre
    setsup1+u2*DMHcmtsresetsup2+
    uNU*DMHcmtsresetsupNU+
    d1*DMHcmtsresetsdown1
  SDMH_MAC_DOMAIN_CMTS_reset=u1*SDMH
    cmtsresetsup1+u2*SDMHcmtsresetsup2+uNU*
    SDMH cmtsresetsupNU+d1*SDMHcmtsresetsdown1
  DMH_MAC_DOMAIN_CM_reset=v1*DMHcmreset
    sup1+v2*DMHcmresetsup2+
    vNU*DMHcmresetsupNU+e1*DMHcmresetsdown1
  SDMH_MAC_DOMAIN_CM_reset=v1*SDMHcmreset
    sup1+v2*SDMHcmresetsup2+vNU*SDMH  cmreset
    supNU+e1*SDMHcmresetsdown1
Finally
  z1=z2=z3=0.5
  DMH_MAC_DOMAIN=z1*DMH_MAC_DOMAIN_
    CER+z2*DMH_MAC_DOMAIN_CMTS_reset+
    z3*DMH_       MAC_DOMAIN=z1*SDMH_MAC_
    DOMAIN_CER+z2*SDMH_MAC_DOMAIN_
    CMTS_reset+z3*DMH_MAC_DOMAIN_CM_reset
This could be thought of as having two additional sub-issues affecting connectivity, one that sums the resets and one that sums the errors.
}

Sum SDMH and DMH totals for each MAC domain in the topology selection and use that as the number for the Degraded Connectivity contributor at the time stamp.

Rule 6: Degraded and Severely Degraded Subscriber Modems

[SUM (the SDMH and DMH number for the time stamp for degraded Traffic)+(the SDMH and DMH number for the time stamp for degraded Connectivity)] and divide by 2. This is the number to be used for the degraded and severely degraded subscriber modems contributor for the time stamp.

Combining Rule Option 3

In this option, all CMTS interface degradations are added, with it assumed that downstream interface typically does not get overutilized due to the asymmetry of traffic, and adding across interfaces occurs without dividing by 2. Using this option, information of SDMH and DMH is available from analysis plug-ins on a per-CMTS-interface basis, and the MAC layer relationship between upstream and downstream CMTS interfaces is known, but not used to affect the counting.

Rules 1-2:

Same as Rules 1-2 for Option 2.

Rule 3:

Similar to Rule 3 of Option 1, but weightings are 1, resulting in a simple sum.

Rule 4: Up Traffic and Down Traffic

Add together upstream and downstream traffic for each cable interface and add across the topology selection for the total number.

Rule 5: Degraded Connectivity

Sum of upstream errors and downstream errors based on anticipating that most modems will have primarily upstream errors and when shown as an interface basis the number will not be diluted.

Sum of CMTS resets and CM resets assuming that these are bad events and this could be weighted heavier even though it is not broken down by upstream and downstream.

Additionally, sum the total SDMH and DMH for each interface, one number from the resets and one number for the errors, and divide by 2. This could be thought of as having two additional sub-issues affecting connectivity, one that sums the resets and one that sums the errors. This will help prevent some double counting, but may be a summation, e.g., if it appears to be minimizing the number of modems with degraded performance due to few of one issue versus the other.

Rule 6: Degraded and Severely Degraded Subscriber Modems

[SUM (the SDMH and DMH number for the time stamp for degraded Traffic)+(the SDMH and DMH number for the time stamp for degraded Connectivity)]. This is the number to be used for the degraded and severely degraded subscriber modems contributor for the time stamp. This is done for each interface. Averaging will help avoid double counting modems.

Combining Rule Option 4

This option of combiner adding logic reduces/eliminates double counting of modems, resulting in accurate absolute metrics of degraded modem hours. Using this option, the degraded traffic block, the degraded connectivity block, and the degraded summary block are calculated hourly (or more frequently and aggregated to the hour) for both the cable interface and the MAC interface in the nodes 34, 36, 38 and distributed from the nodes 34, 36, 38 to the controller 40. It requires some more items to be included in a list that has all cable modems per interface that already is cached in memory during the calculation of degradation for each network issue.

Table 3 lists an example of a set of indicators and some attributes of these based on a possible aggregation rate. These time frames will change based on needs for sampling rate and network quality, but represent a typical example. For example, the NSI interfaces are collected every minute to help avoid counter roll-over.

TABLE 3

Interface, CM, and CMTS contributors

| Application | Direct/Indirect | Contributor | Collection |
|---|---|---|---|
| Per Interface contributors | | | |
| Traffic | Direct | Up Util | 15 |
| Traffic | Direct | Dn util | 15 |
| Connectivity | Direct | Up Errors | 15 |
| Connectivity | Indirect | Up SNR | 15 |
| Per CM contributors rolled up to interface | | | |
| Connectivity | Indirect | Up RXPwr | 15 |
| Connectivity | Indirect | Up TXPWR | 60 |
| Connectivity | Direct | Dn Errors | 60 |
| Connectivity | Indirect | Dn SNR | 60 |
| Connectivity | Indirect | Dn RXPwr | 60 |
| Connectivity | Direct | CM Resets | 15 TRAP |
| Per CMTS contributors rolled down to interface | | | |
| Traffic | Indirect | CMTS Processor | 15 |
| Traffic | Indirect | Out NSI | 15 |
| Traffic | Indirect | In NSI | 15 |
| Connectivity | Direct | CMTS Resets | 60 TRAP |

Combining into higher-level contributor blocks of Degraded Traffic Status and Degraded Connectivity Status and Degraded Summary only uses direct contributors. Demonstrating only the direct contributors from the example above that are used for these second-level and third-level metric calculations leaves the contributors shown in Table 4. The lists in Table 4 can change as network issues are promoted to direct, or reduced to indirect, or new contributors are added to the combiner.

TABLE 4

Direct interface, CM, and CMTS contributors

| Application | Direct/Indirect | Contributor | Collection |
|---|---|---|---|
| Per Interface contributors | | | |
| Traffic | Direct | Up Util | 15 |
| Traffic | Direct | Dn util | 15 |
| Connectivity | Direct | Up Errors | 15 |
| Per CM contributors rolled up to interface | | | |
| Connectivity | Direct | Dn Errors | 60 |
| Connectivity | Direct | CM Resets | 15 TRAP |
| Per CMTS contributors rolled down to interface | | | |
| Connectivity | Direct | CMTS Resets | 60 TRAP |

Where collection indicates the number of minutes between data collection, with "trap" indicating asynchronous collection.

Thus, there are two direct contributors for Degraded Traffic, four direct contributors for Degraded Connectivity, and six direct contributors for Degraded Summary.

By tracking, for each CM for each interface, a table similar to Table 5 (for the collector) that is cached in memory, the combining mathematics should not (and could even be guaranteed not to) underestimate the number of modem hours and or double count modem hours. Using the logic following Table 5 to build the table and calculate the three higher level contributors for each cable interface, these values could be passed up for each cable interface along with the SDMH, DMH, and NDMH calculated.

In Table 5, for each column, the fraction of an hour that was used for each per contributor SDMH and DMH calculation is recorded and inserted in the appropriate column as determined by comparison to the respective thresholds. The following rules apply. For each 15-minute sample of a direct contributor including Up Util, Dn Util, Up Errors that is applied to an interface, add 0.25 to each modem on the interface in the column in Table 5 that reflects the degraded modem status as calculated in the status rule. For each of the four 15-minute samples in the hour before distribution, add this 0.25 to the value from the last sample. For CM resets, add 0.25 to each modem that qualifies for severely degraded or degraded status per the status rule based on traps. For the per CM contributor that is currently calculated every 60 minutes for each modem, add 1 to the correct column for each modem. For the CMTS resets, add 1 to each modem on the CMTS for any hour in which the CMTS resets. The summary columns are simple sums of the numbers from the traffic set of columns and the connectivity set of columns. The SDMH Traffic column is added to the SDMH Connectivity column, the DMH column to the DMH column, and the NDMH to the NDMH column. Thus, for each modem, adding across the row in most cases will yield the number of direct contributors, e.g., two for the Degraded Traffic Block, four for the Degraded Connectivity Block, and six for the Degraded Summary Block. The sum across the columns will not add up to the number of direct contributors if data are missed or a modem is added or deleted from the system during the hour.

```
        SDMH = X
        DMH=0
        NDMH=0
    Else
        SDMH=SDMH
        If DMH >= X-SDMH Then
        {
            DMH = X-SDMH
            NDMH = 0
        Else
            DMH=DMH
            If NDMH >= X-(SDMH+DMH) Then
            {
                NDMH = X-(SDMH+DMH)
            Else
                NDMH = NDMH
            }
        }
    }
}
```

Sum the numbers from the columns for all modems on the interface, divide the sum by X, and multiply by MAX(total modems used for each of the per contributor degraded modem hours calculations' 4 samples or more during the hour). This results in 3 numbers for the interface. This calculation should be done for each cable interface and each MAC interface.
}

TABLE 5

| | Traffic | | | Connectivity | | | Summary | | |
|---|---|---|---|---|---|---|---|---|---|
| | SDMH_cnt | DMH_cnt | NDMH_cnt | SDMH_cnt | DMH_cnt | NDMH_cnt | SDMH_cnt | DMH_cnt | NDMH_cnt |
| 009083388F23 | 0.25 | 0.5 | 1.25 | 0.25 | 0.5 | 3.25 | 0.5 | 1 | 4.5 |
| 0090833095F7 | 0.25 | 0.5 | 1.25 | 0.25 | 0.5 | 3.25 | 0.5 | 1 | 4.5 |
| 009083331EBA | 0.25 | 0.5 | 1.25 | 0.25 | 0.5 | 3.25 | 0.5 | 1 | 4.5 |
| 009083325DE9 | 0 | 0.5 | 1.5 | 2 | 1 | 1 | 2 | 1.5 | 2.5 |
| 009083325E3F | 0 | 0.5 | 1.5 | 2 | 1 | 1 | 2 | 1.5 | 2.5 |
| 0090833CA5EB | 0 | 0.75 | 1.25 | 2 | 1 | 1 | 2 | 1.75 | 2.25 |
| 00908330AFF5 | 0 | 0.75 | 1.25 | 2 | 1 | 1 | 2 | 1.75 | 2.25 |
| 00908338AF43 | 0.5 | 0.75 | 0.75 | 2 | 1 | 1 | 2.5 | 1.75 | 1.75 |
| 0090833CF4AB | 0.5 | 0.75 | 0.75 | 2 | 1 | 1 | 2.5 | 1.75 | 1.75 |
| 0090833261BF | 0.5 | 0.75 | 0.75 | 2 | 1 | 1 | 2.5 | 1.75 | 1.75 |
| 00908330B0EF | 0.5 | 0.75 | 0.75 | 2 | 0.75 | 1.25 | 2.5 | 1.5 | 2 |
| 0090833095B1 | 0.25 | 0.75 | 1 | 2 | 0.75 | 1.25 | 2.25 | 1.5 | 2.25 |
| 00908338AC1B | 0.25 | 0.25 | 1.5 | 0.25 | 0.25 | 3.5 | 0.5 | 0.5 | 5 |
| 009083326241 | 0 | 0 | 2 | 0.5 | 0.5 | 3 | 0.5 | 0.5 | 5 |
| 00908330659C | 0 | 0 | 2 | 0.5 | 0.5 | 3 | 0.5 | 0.5 | 5 |

The following calculations yield the value for each of the contributor blocks. These calculations use the samples that have been evaluated for degraded modem status and can be performed before distribution of the hourly, or higher resolution, data from the nodes 34, 36, 38 to the controller 40.

For each of the three combined blocks:
{
X=number of direct contributors i.e. 2 for traffic, 4 for connectivity, and 6 for summary For each MAC interface, perform normalization
{
For each modem attached to the interface, adjust the number in each column as follows

```
        {
            If SDMH number = X Then
            {
```

Apply the three indicators (SDMH, DMH, NDMH) to the Block currently under calculation for the specific cable interface to be displayed in the table view (see FIG. 3 and discussion).
}
When summing across topology larger than a single cable interface for combiner structure, sum across all MAC domains contained in the topology.

Hierarchical Display of Network Performance

Figure 3:
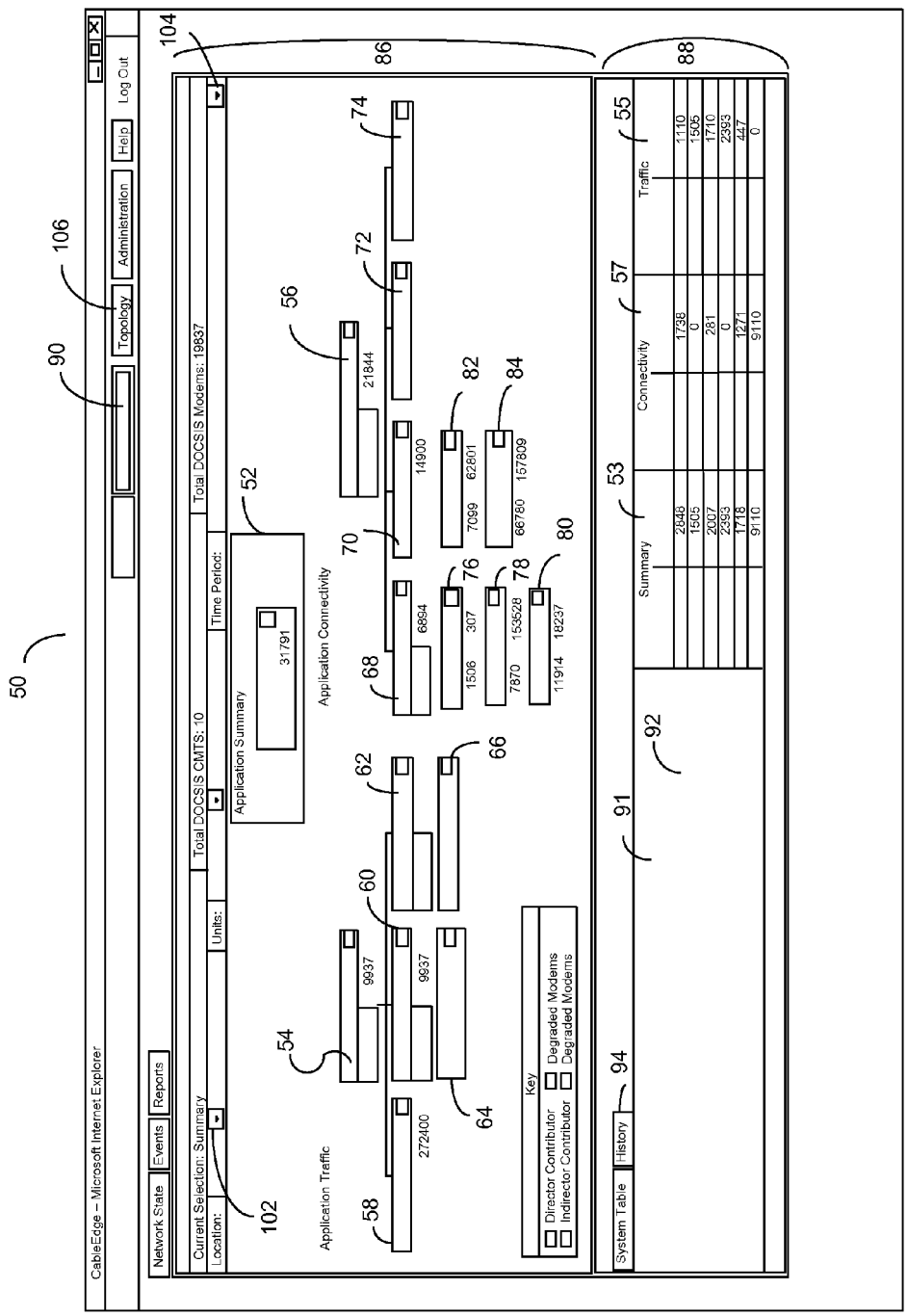
FIGS. 3-5 are screenshots of a computer display provided by the network monitoring system shown in FIG. 1, showing network performance.

Referring to FIG. 1, the application suite 22 is configured to process data from the controller 40 into a user-friendly format. For example, the application suite 22 can take data that is stored in an accessible format and configuration by the controller 40 and arrange and display the data on a display screen of a computer. An example of such a display 50 is shown in FIG. 3. The data can be accessed independently from the display 50 and can be formatted in displays other than the display 50. The display 50 provides values of SDMH and DMH associated with various network performance categories. While the entries shown are in SDMH and DMH, the entries can be in number of modems, number of modems that are degraded and the number of modems in the network, or percent of the network that is degraded or severely degraded. Numbers provided in the display 50 are preferably periodically, automatically updated.

Referring to FIGS. 1 and 3, the display 50 provides a hierarchical table indicating network performance. The hierarchical display 50 includes a top level 52 indicating summary performance of the entire network (or a selected portion thereof as discussed further below), network traffic 54, and network connectivity 56. Within the indications of traffic 54 and connectivity 56, there are indications for values associated with direct and indirect contributors to the network traffic 54 and connectivity 56. The direct and indirect contributors can be distinguished based upon shading, coloring, and/or other visibly distinguishable characteristics such as symbols as shown. As shown, the traffic 54 and the connectivity 56 are direct contributors to the summary category 52, up traffic 60 and down traffic 62 are direct contributors to the traffic 54, while CMTS processor 58, out NSI (network-side interface) traffic 64, and in NSI traffic 66 are indirect contributors to the traffic 54. Further, up errors 68, down errors 70, CMTS resets 72, and CM resets 74 are direct contributors to the connectivity 56, while up SNR 76, up receive power 78, up transmit power 80, down SNR 82, and down receive power 84 are indirect contributors to the connectivity 56.

While direct contributors are the root cause of performance degradation, indirect contributors are factors that result in the root cause degradation. Direct contributors are included in the combining logic when moving up the combining hierarchy. The combining structure of the controller 40 is configured such that new network issues can be added to the structure as research finds that they predict degraded performance of the applications on the network 19. Contributors can be removed if the opposite is found. Additionally indirect contributors can be "promoted" to direct contributors if it is determined that they provide direct correlation to degraded performance. Direct contributors can likewise be "demoted." Such alterations can be made automatically by the system 18 or manually by the user 26.

Figure 8:
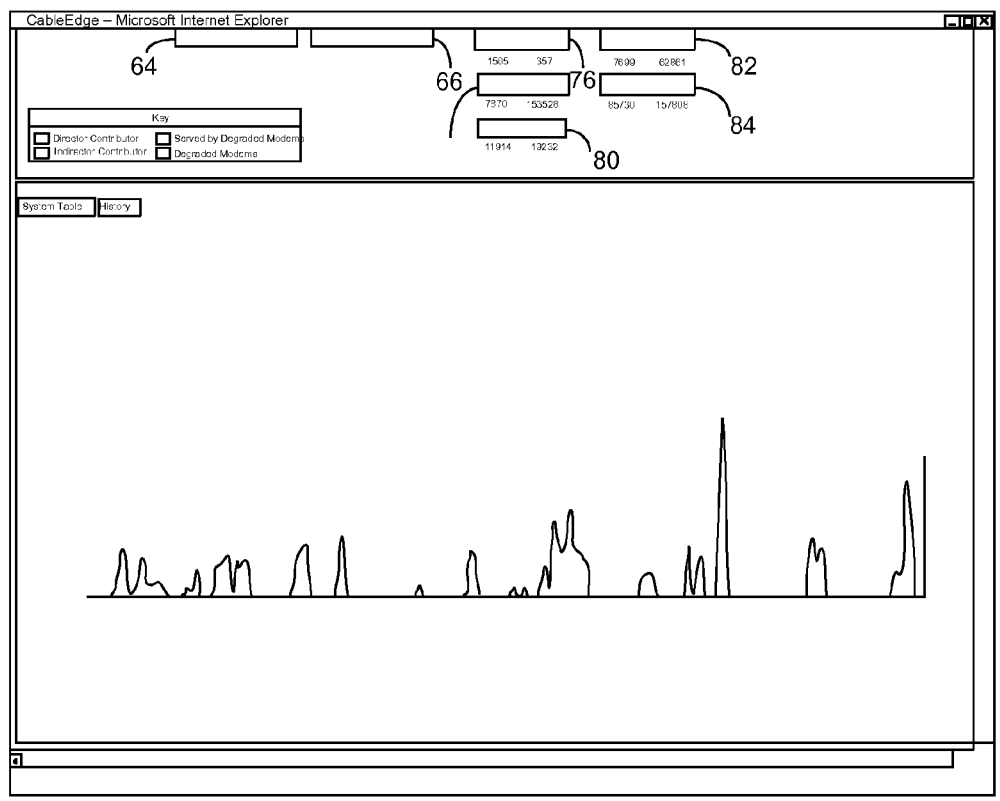
FIG. 8 is a screenshot of a computer display provided by the network monitoring system shown in FIG. 1, showing network performance over time.

The display 50 provides a convenient, single-screen indication of network performance at various levels of refinement. An upper portion 86 of the display 50 provides information at higher levels of the selected portion of the network 19 and a lower portion 88 provides more refined detail regarding a currently-selected category from the upper portion 86. Using a drop-down menu 90, or by selecting a particular block of the display 50, e.g., any of blocks 52 through 80, the user 26 can select which category, including the summary 52, traffic 54, or connectivity 56 categories, and/or any direct or indirect contributors, from the upper portion 86 of the display 50 about which to provide more detail in the lower portion 88. As shown in FIG. 3, the summary category 52 is currently selected, with the lower portion 88 showing locations of CMTS interfaces affecting the network performance and the SDMH and DMH associated with each of those CMTS interfaces as they affect the summary 52, connectivity 56, and traffic/capacity 54 categories. The CMTS interfaces are sorted according to location with highest SDMH initially, with as many locations as space permits being displayed on the display 50. The categories of the CMTS interface location 91, summary 53, connectivity 57, and traffic/capacity 55 can be selected by the user 26 to sort in accordance with that category or subcategories of SDMH or DMH within the broader categories. A location 92 can also be selected by the user 26 to reveal more detailed information including performance recommendations, historical graphs of SDMH and DMH, and graphs of the actual network values associated with the selected CMTS interface over time. The user 26 may also select a history icon 94, and in response the application suite 22 will provide history of the displayed metrics. For example, as shown in FIG. 8, a history screenshot 95 shows numbers of cable modems that are severely degraded and degraded over time for indirect contributors 64, 66, 76, 78, 80, 82, and 84.

Figure 4:
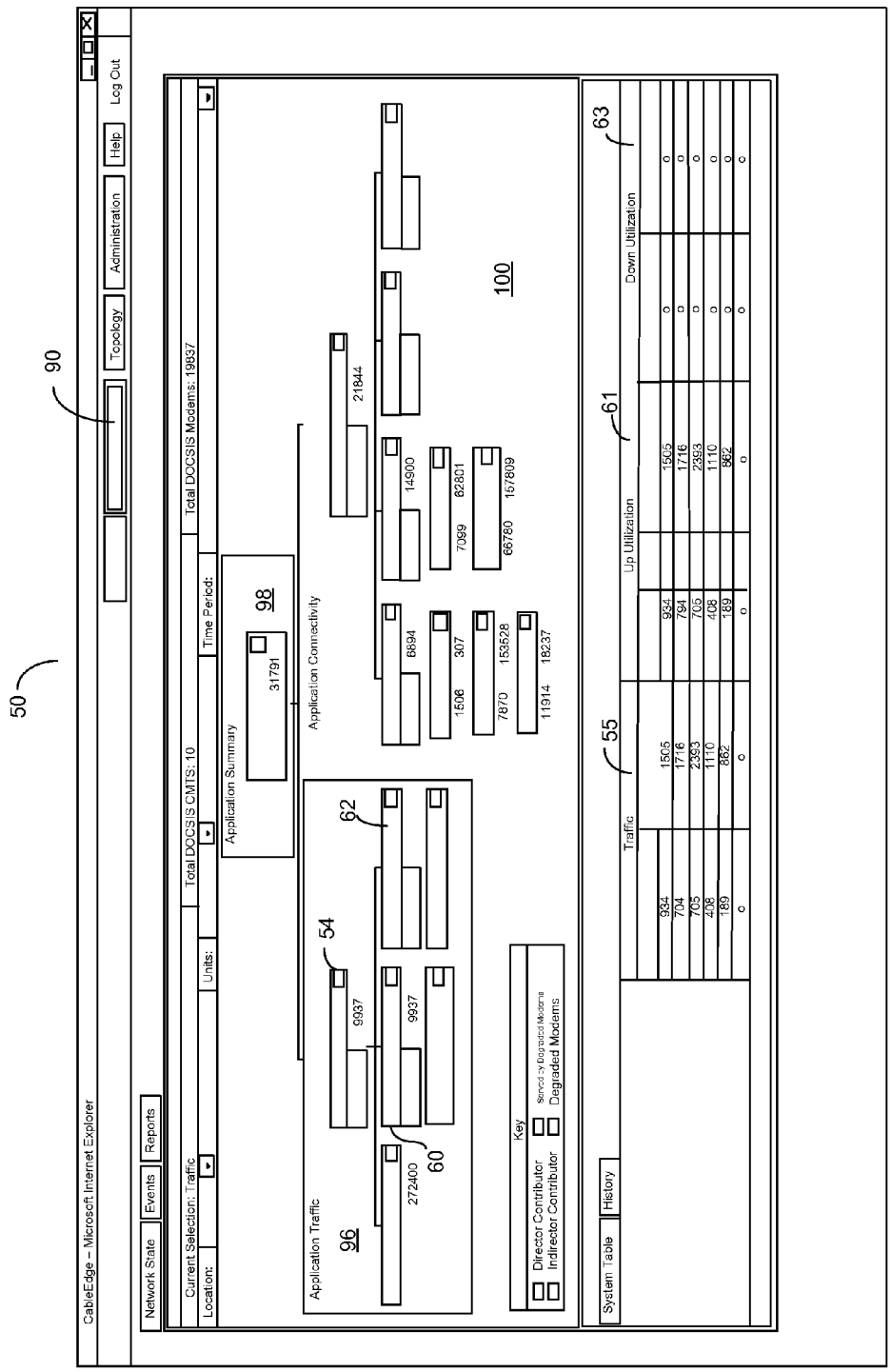

Referring to FIG. 4, the display 50 has changed to reflect more detail regarding traffic/capacity 54 performance of the network in response to the user 26 using the drop-down menu 90 select the traffic choice or by the user 26 selecting either of the capacity/traffic blocks 54 or 55. In response to this selection, the traffic region 96 is displayed with a more prominent background than regions 98 and 100 for the summary 52 and connectivity 56 categories, respectively. Also, the lower portion 88 of the display 50, in response to the traffic selection, shows detail regarding the locations of CMTS interfaces affecting the traffic category 54, 55, as well as showing corresponding SDMH and DMH values associated with the CMTS interfaces for the traffic 54, 55, up utilization 60, 61, and down utilization 62, 63 contributors.

Figure 5:
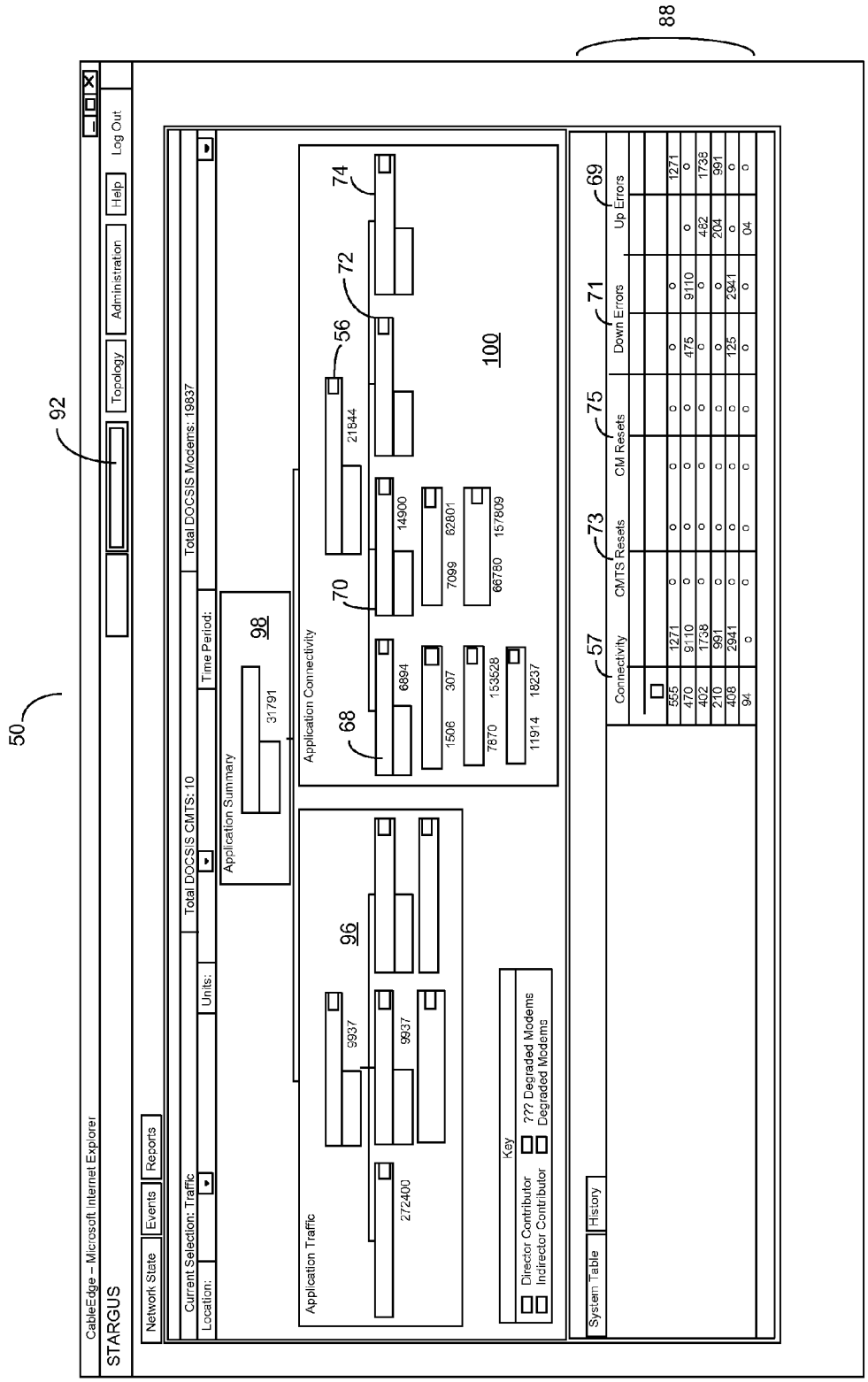

Referring to FIG. 5, the display 50 has changed to reflect more detail regarding connectivity performance 56 of the network in response to the user 26 using the drop-down menu 90 select the connectivity 56 choice or by the user 26 selecting either of the connectivity blocks 56 or 57. In response to this selection, the connectivity region 100 is displayed with a more prominent background than regions 96 and 98 for the traffic and summary categories, respectively. Also, the lower portion 88 of the display 50, in response to the connectivity selection, shows detail regarding the locations of CMTS interfaces affecting the connectivity category 56, 57, as well as showing corresponding SDMH and DMH values associated with the CMTS interfaces for the connectivity 56, 57, CMTS resets 74, 75, down errors 70, 71 and up errors 68, 69 contributors.

Referring again to FIGS. 1 and 3, the user 26 may select a portion of the network 19 for display by the application suite 22, as well as a time period for the display 50. The application suite 22 is configured to provide the display 50 such that the user 26 can use a drop-down menu 102 to select a portion of the network 19 about which to display information on the display 50. Likewise, the user 26 can use a drop-down menu 104 to select a time for which the display 50 should reflect information. For the selectable time, the length of time may become coarse the more removed in time the collected data are. For example, data from a month ago may only be able to be displayed by the day while data collected today may be displayed by the hour. To help the user 26 refine the selection for topology to be reflected in the display 50, the user may select a topology icon 106 in order to be provided with an interface for more flexibly selected desired areas of the topology.

Figure 6:
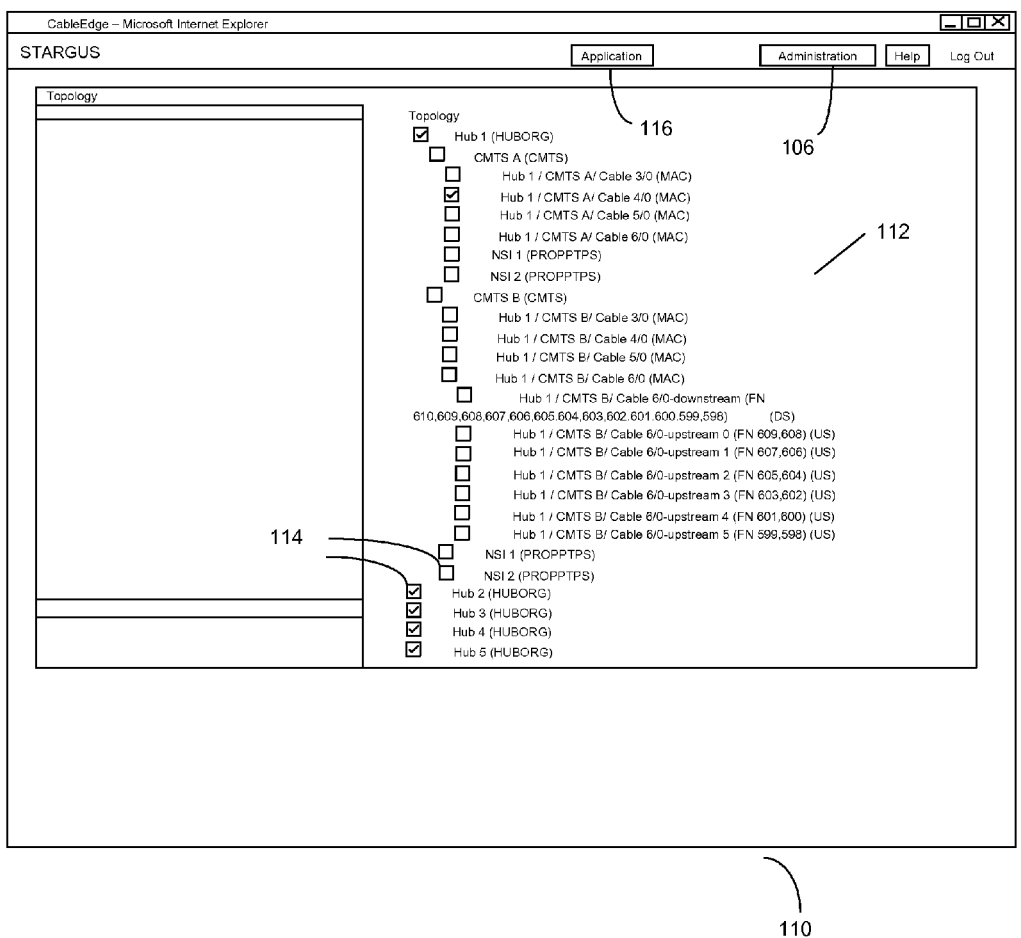
FIG. 6 is a screenshot of a computer display provided by the network monitoring system shown in FIG. 1, showing network topology.
Figure 7:
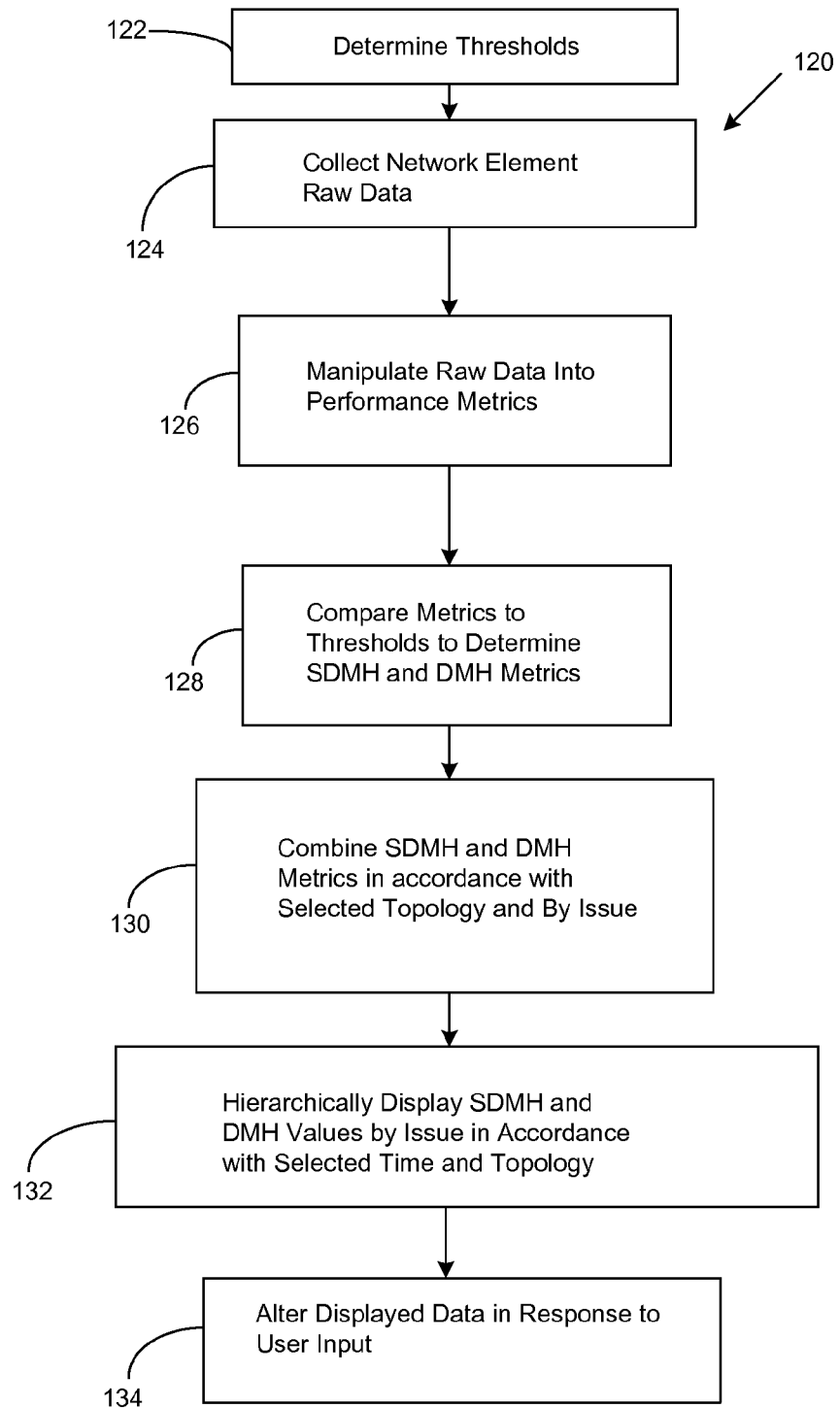
FIG. 7 is a flowchart of a process of monitoring network activity, and analyzing and reporting network performance.

Referring also to FIG. 6, the application suite 22 is configured to, in response to the user 26 selecting the topology icon 106, provide a display 110. The display 110 provides a tree structure 112 that can be expanded by appropriate selections by the user 26 of icons indicating that more detail is available (here, icons with a plus sign in a box). The user 26 can select boxes 114 associated with network elements to indicate a desire to have the topology associated with these boxes 114 displayed. Information for all network elements associated with the selected box 114, including lower-level elements associated with the selected higher-level element, will be displayed by the application suite 22. Individual boxes of lower-level network elements can be selected, or deselected as desired. The user 26 can return to the application display 50 by selecting an application icon 116.

Referring to FIGS. 1-7, a process 120 for collecting, displaying an analyzing network performance includes the stages shown. The stages shown for the process 120 are exemplary only and not limiting. The process 120 can be altered, e.g., by having stages added, removed, or rearranged.

At stage 122, the thresholds for determining whether a modem is degraded or severely degraded are determined. These thresholds are preferably determined in advance to help reduce the processing time used to determine whether a modem is severely degraded or degraded. The calculations for determining the thresholds can be time and processing intensive and based on computer models, empirically controlled experiments, information about network equipment configuration and real-time performance data and historically trending. The thresholdings may be updated based on real-time information about network equipment and performance data.

At stage 124, the nodes 34, 36, 38 collect raw data related to network performance of the network elements in the network 19. The nodes 34, 36, 38 use synchronous probing of MIB objects as well as asynchronous information provided from the networks 12, 14, 16 to gather data regarding performance on the network 19. Data are gathered for each CMTS interface and CM of the network 19. Data may also be collected from other network elements using other network protocols such as DHCP, TFTP, HTTP, etc.

At stage 126, the real-time and near-real-time raw data collected are manipulated into performance metrics describing network performance. These metrics of network performance are compared at stage 128 to the thresholds, determined at stage 122, to determine degraded modem hours and severely degraded modem hours metrics. The SDMH and DMH metrics are derived by aggregating, as appropriate, over time the comparisons of the network performance metrics to the thresholds according to the frequencies of sampling of the raw data from the network 19. The SDMH and DMH metrics are associated with corresponding CMTS interfaces of the network 19. The SDMH and DMH metrics are provided to the controller 40 for aggregation.

At stage 130, the controller 40 combines the SDMH and DMH metrics in accordance with topology selected by the user 26 and by issue affecting network performance. The controller 40 combines the SDMH and DMH metrics in accordance with combining rules associated with a corresponding combining option, such as, but not limited to, the rules discussed above. The combining option used may be predetermined or may be selected by the user 26. The combined SDMH and DMH metric information, as well as more detailed DMH and SDMH data are available for display by the application suite 22.

At stage 132, the application suite 22 hierarchically displays the SDMH and DMH values by issue in accordance with selected time and topology. In accordance with selections made by the user 26 for a time over which network performance data is desired, and for desired portions of the network 19, or the entire network 19, the application suite 20 obtains, massages, and displays appropriate information to the user 26. The displayed information is in terms of SDMH and DMH values, that incorporate SDMH and DMH data at logically-lower levels of the network.

At stage 134, the application suite 22 alters the display 50 in response to input by the user 26. In response to the user 26 selecting different options on the display 50, more detail regarding levels of the hierarchical display 50 are provided.

The user may select portions of the display 50 to narrow in on problems associated with network performance to thereby determine areas of greatest network problems and possibly options for addressing those problems. As the user 26 selects portions of the display 50 to provide more detail regarding the selected portions, the application suite 22 "bubbles up" more detail regarding the selected information. The user 26 may use this "bubbled up" information to refine the user's understanding of the network performance, and in particular areas, and causes, of network problems. The application suite 22 may also automatically, using the detail provided by the system 18, determine areas of concern regarding the network 19 and provide suggestions for correcting or improving network performance. The user 26 may also select the performance metrics to be changed to number of modems, number of degraded and total network modems (at least of the selected topology), or percent of the network (at least of the selected topology) that is degraded.

Other embodiments are within the scope and spirit of the appended claims. For example, due to the nature of software, functions described above can be implemented using software, hardware, firmware, hardwiring, or combinations of any of these. Features implementing functions may also be physically located at various positions, including other than as shown, and including being distributed such that portions of functions are implemented at different physical locations. For example, functions performed by the controller 40 for combining metrics may be performed by the nodes 34, 36, 38. In this case, the nodes 34, 36, 38 may communicate with each other to assist in combining metrics. Parameters shown as individual values in the display 50 may not be individual values. For example, parameters could be ranges of individual values over time (e.g., SNR=12-20 over prior hour). Also, while the discussion focused on modem problems (e.g., SDMH and DMH), problems with other CPE may also be determined and included in displayed metrics, or displayed separately.

The invention is particularly useful with DOCSIS networks. The DOCSIS 1.1 specifications SP-BPI+, SP-CMCI, SP-OSSIv1.1, SP-RFIv1.1, BPI ATP, CMCI ATP, OSS ATP, RFI ATP, and SP-PICS, and DOCSIS 1.0 specifications SP-BPI, SP-CMTRI, SP-CMCI, SP-CMTS-NSI, SP-OSSI, SP-OSSI-RF, SP-OSSI-TR, SP-OSSI-BPI, SP-RFI, TP-ATP, and SP-PICS are incorporated here by reference. The invention, as embodied in the claims, however, is not limited to these specifications, it being contemplated that the invention embodied in the claims is useful for/with, and the claims cover, other networks/standards such as DOCSIS 2.0, due to be released in December, 2001.

Additionally, the system 18, e.g., the data analyzer 44, may automatically determine network areas of concern and implement actions, e.g., configuring the network 19 through the data collector controller 40, to correct or improve network performance problems without user input, or with reduced user input compared to that described above, for correcting or mitigating network problems. Based on the SDMH and DMH metric performance, judgments of the network performance are made. Network configuration such as modulation type, Forward Error Correction (FEC) level, codeword size, and/or symbol rate are known. Based on the performance metrics and configuration information, a more optimal solution can be instantiated through the controller 46 into the CMTS through SNMP or the command line interface (cli). This more optimal solution is based on data analysis and real-time calculations along with parameterized CMTS configurations that provide maximum bandwidth efficiency in bits per second per Hz while maintaining packet errors below a level that would hinder (e.g., cause sub-optimal) application performance. As performance, indicated by the metrics, improves or degrades due to the new configuration, changing network properties, and/or changes in traffic capacity, the CMTS will be configured to maintain improved (e.g., optimized) performance.

What is claimed is:

1. A computer-program product comprising a non-transitory computer-readable storage medium having encoded therein computer-executable instructions for causing a computer to:
   obtain performance data related to a performance of a broadband network; and
   provide a hierarchical display of network performance, the hierarchical display including a first level with first data indicative of network operation and a second level with second data indicative of a plurality of issues affecting the first level of network performance;
   wherein the second level includes multiple issues that contain a third level with third data indicative of contributing factors of the issues,
      said instruction to provide a hierarchical display includes an instruction to obtain indicia of cumulative amounts of time that network elements of at least a desired portion of a broadband network were considered at each issue of the second level during a designated time frame; said computer executable instructions further comprising:
         instructions to display the cumulative amounts in a hierarchy of network issues, the hierarchy including a summary category including summary values indicating total cumulative amounts of time the network elements in the at least a desired portion of the network were considered at corresponding issues, the hierarchy further comprising a plurality of sub-categories contributing to the summary category, and the sub-categories each further comprising at least one sub-sub-category contributing to the sub-categories, each issue being a predetermined threshold of modem hour quality;
      wherein the issues are classified as direct and indirect contributors to modem hour quality, the direct issues comprising cable modem resets, cable modem termination system resets, and downstream and upstream codeword error ratios, and indirect issues comprising upstream and downstream transmit and receive power and downstream and upstream signal to noise ratio, wherein a direct issue directly affects modem hour quality and an indirect issue directly affects a direct issue;
         instructions for causing the computer to recommend action, regarding at least one of the network areas that are most-negatively contributing to network performance for improving network performance.

2. The computer program product of claim 1 wherein the summary values indicate total cumulative amounts of time that all the network elements in the at least a desired portion of the network were considered at corresponding qualities of performance.

3. The computer program product of claim 1 further comprising instructions for causing the computer to indicate that categories contributing to a higher-level category are one of direct contributors and indirect contributors to the higher-level category.

4. The computer program product of claim 1 further comprising instructions for causing the computer to display additional information regarding a selected category of cumulative amounts.

5. The computer program product of claim 4 further comprising instructions for causing the computer to display further additional information regarding selected additional information.

6. The computer program product of claim 1, further comprising instructions for causing the computer to implement action, regarding at least one of the network areas that are most-negatively contributing to network performance, for improving network performance.

7. The computer program product of claim 1 wherein the instructions for causing the computer to obtain indicia of cumulative amounts of time that network elements cause the computer to access a storage area containing the indicia.

8. A method, comprising:
   obtaining performance data related to a performance of a broadband network; and
   providing a hierarchical display of network performance, the hierarchical display including a first level with first data indicative of network operation and a second level with second data indicative of a plurality of issues affecting the first level of network performance, wherein the second level includes multiple issues that contain a third level with third data indicative of contributing at least some of the secondary level issues, each issue being a predetermined threshold of modem hour quality;
   said providing a hierarchical display includes obtaining indicia of cumulative amounts of time that network elements of at least a desired portion of a broadband network were considered at each issue during a designated time frame; said method further comprising:
      displaying the cumulative amounts in a hierarchy of network issues, the hierarchy including a summary category including summary values indicating total cumulative amounts of time that the network elements in the at least a desired portion of the network were considered at corresponding issues, the hierarchy further comprising a plurality of sub-categories contributing to the summary category, and the sub-categories each further comprising at least one sub-sub-category contributing to the sub-categories,
   wherein the issues are classified as direct and indirect contributors to modem hour quality, the direct issues comprising cable modem resets, cable modem termination system resets, and downstream and upstream codeword error ratios, and indirect issues comprising upstream and downstream transmit and receive power and downstream and upstream signal to noise ratio, wherein a direct issue directly affects modem hour quality and an indirect issue directly affects a direct issue;
      recommending action, regarding at least one of the network areas that are most-negatively contributing to network performance for improving network performance.

9. The method of claim 8, wherein the summary values indicate total cumulative amounts of time that all the network elements in the at least a desired portion of the network were considered at corresponding qualities of performance.

10. The method of claim 8, further comprising:
    indicating that categories contributing to a higher-level category are one of direct contributors and indirect contributors to the higher-level category.

11. The method of claim 8, further comprising:
displaying additional information regarding a selected category of cumulative amounts.

12. The method of claim 11, further comprising:
displaying further additional information regarding selected additional information.

13. The method of claim 8, further comprising: implementing action, regarding at least one of the network areas that are most-negatively contributing to network performance, for improving network performance.

14. The method of claim 8, wherein said step of obtain indicia of cumulative amounts of time that network elements comprises:
accessing a storage area containing the indicia.

15. A computer-program product comprising a non-transitory computer-readable storage medium having encoded therein computer-executable instructions for causing a computer to:
obtain performance data related to a performance of a broadband network; and
provide a hierarchical display of network performance, the hierarchical display including a first level with first data indicative of network operation and a second level with second data indicative of a plurality of issues affecting the first level of network performance;
wherein the second level includes multiple issues that contain a third level with third data indicative of network issues comprising at least some of the secondary level issues;
the computer program product further comprising instructions for causing the computer to analyze the more detail and to provide an indication of a likely network problem, and a suggested action for addressing the likely network problem;
wherein the first and second data provide indicia of grades of degradation of performance of at least portions of the network as a function of time; and
wherein a network is a DOCSIS network including cable modems and cable modem termination systems, and the first and second data indicate numbers of cable-modem hours at the grades of degradation;
wherein the issues are classified as direct and indirect contributors to modem hour quality, the direct issues comprising cable modem resets, cable modem termination system resets, and downstream and upstream codeword error ratios, and indirect issues comprising upstream and downstream transmit and receive power and downstream and upstream signal to noise ratio, wherein a direct issue directly affects modem hour quality and an indirect issue directly affects a direct issue.

16. A method, comprising:
obtaining performance data related to performance of a broadband network; and providing a hierarchical display of network performance, the hierarchical display
including a first level with first data indicative of network operation and a second level with second data indicative of a plurality of issues comprising the first level of network performance, wherein
the second level includes multiple issues that contain a third level with third data indicative of network issues comprising at least some of the secondary level issues; and
providing an indication of a likely network problem, and a suggested action for addressing the likely network problem;
wherein the first and second data provide indicia of grades of degradation of performance of at least portions of the network as a function of time; and
wherein the network is a DOCSIS network including cable modems and cable modem termination systems, and the first and second data indicate numbers of cable-modem hours at the grades of degradation;
wherein the issues are classified as direct and indirect contributors to modem hour quality, the direct issues comprising cable modem resets, cable modem termination system resets, and
downstream and upstream codeword error ratios, and the indirect issues comprising upstream and downstream transmit and receive power and downstream and upstream signal to noise ratio, wherein a direct issue directly affects modem hour quality, and an indirect issue directly affects a direct issue.

\* \* \* \* \*